US010316537B2

(12) United States Patent
Kersten

(10) Patent No.: US 10,316,537 B2
(45) Date of Patent: Jun. 11, 2019

(54) TENSION CORD GUIDE IN A WIND TURBINE TOWER

(71) Applicant: Wobben Properties GmbH, Aurich (DE)

(72) Inventor: Roy Kersten, Hohenwarthe (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/564,717

(22) PCT Filed: Apr. 8, 2016

(86) PCT No.: PCT/EP2016/057745
§ 371 (c)(1),
(2) Date: Oct. 5, 2017

(87) PCT Pub. No.: WO2016/166026
PCT Pub. Date: Oct. 20, 2016

(65) Prior Publication Data

US 2018/0106061 A1 Apr. 19, 2018

(30) Foreign Application Priority Data

Apr. 14, 2015 (DE) ........................ 10 2015 206 668

(51) Int. Cl.

| | |
|---|---|
| ***E04H 12/16*** | (2006.01) |
| ***E04C 5/16*** | (2006.01) |
| *F03D 13/20* | (2016.01) |

(52) U.S. Cl.
CPC ............... *E04H 12/16* (2013.01); *E04C 5/16* (2013.01); *F03D 13/20* (2016.05); *F05B 2230/61* (2013.01); *Y02E 10/726* (2013.01)

(58) Field of Classification Search
CPC . E04C 5/16; F03D 13/20; E04H 12/16; F05B 2230/61
See application file for complete search history.

(56) References Cited

U.S. PATENT DOCUMENTS 8,499,896 B2 * 8/2013 Midtgaard ................ E04G 3/32 182/141
2011/0113708 A1 * 5/2011 Skjaerbaek ............. E04C 5/125 52/223.1

(Continued)

FOREIGN PATENT DOCUMENTS

CN 202064270 U 12/2011
DE 3806759 A1 9/1989

(Continued)

*Primary Examiner* — Babajide A Demuren
(74) *Attorney, Agent, or Firm* — Seed Intellectual Property Law Group LLP

(57) ABSTRACT

A device for guiding bracing cables in a tower of a wind turbine. The device comprises at least one guide bracket to be arranged in the tower between a tower wall and at least one of the bracing cables, such that the at least one bracing cable bears against the guide bracket and is thereby guided along the tower wall, and a bracket mount for attaching the guide bracket to the tower wall, wherein the position of the guide bracket in the circumferential direction of the tower along the bracket mount can be changed in order to match the position of the at least one bracing cable.

13 Claims, 4 Drawing Sheets

(56) References Cited

U.S. PATENT DOCUMENTS

| | | | | |
|---|---|---|---|---|
| 2011/0138704 | A1* | 6/2011 | Bagepalli | E04H 12/12 52/147 |
| 2011/0155420 | A1* | 6/2011 | Ollgaard | B66D 1/36 174/135 |
| 2013/0183133 | A1* | 7/2013 | Munk-Hansen | B66D 1/36 414/800 |
| 2015/0048043 | A1* | 2/2015 | Laurens | B66C 23/207 212/179 |
| 2015/0096240 | A1* | 4/2015 | Arlab N Gabeiras | E04H 12/342 52/40 |

FOREIGN PATENT DOCUMENTS

| | | | |
|---|---|---|---|
| DE | 4001577 | A1 | 7/1991 |
| EP | 2339094 | A1 | 6/2011 |
| EP | 1262614 | B2 | 3/2015 |

* cited by examiner

TENSION CORD GUIDE IN A WIND TURBINE TOWER

BACKGROUND

Technical Field

The present invention relates to a device for guiding bracing cables in a tower of a wind turbine. This device can also, synonymously, be termed bracing cable guide. The present invention also relates to a wind turbine having at least one such device. The present invention also relates to a method for erecting a tower of a wind turbine. The invention also relates to a tower of a wind turbine.

Description of the Related Art

Wind turbines are known and modern wind turbines are usually erected on special towers, thus wind turbine towers. Fundamentally, there is a distinction between steel towers, concrete towers and mixed-construction towers which are generally made of concrete in the lower region and have a steel tower section in the upper region.

Such concrete towers or towers with concrete sections are usually, in contrast for example to common practice for television towers, constructed of prefabricated concrete segments and braced with bracing cables. The present invention relates especially to such towers or tower sections constructed of prefabricated concrete parts.

One possibility for bracing using bracing cables consists in guiding the bracing cables outside the tower wall but inside the tower. European patent EP 1 262 614 B1 describes one possible fundamental method of doing this. The bracing cables are then in principle visible and also accessible from inside the tower. This allows simple bracing of a tower, in particular from the top of the tower to the bracing foundation. Purely by way of precaution, it is pointed out here that subsequent embodiments for bracing a concrete tower should also in principle be understood by analogy for bracing a concrete tower section of a mixed-construction tower.

In any case, the heights over which such bracing cables are drawn are generally very large. This can lead to the problem that these bracing cables can vibrate and/or come into contact with the tower wall. This is in particular the case if the tower has a concave shape in the vertical direction. This means that it has, in the vertical direction, a curvature towards the inside of the tower, that is to say an inward-oriented curvature, and such bracing cables would bear against this. Movement of the cables presents the risk of damage to the tower wall and/or to the bracing cable.

To that end, it has been shown, in the above-mentioned European patent EP 1 262 614 B1, that it is possible to arrange securing elements in the tower in order to guide the bracing cables. In that case, this is for example carried out for a four-cable bundle. There, four bracing cables are guided along the tower wall in a type of bracket or attachment, which prevents contact with the tower but also prevents the bracing cables from moving in the circumferential direction.

The problem of this is that, in particular due to manufacturing tolerances, the precise circumferential position of each and every bracing cable is not known in advance. If the bracing cable is guided and then tensioned in an attachment as described therein, it is possible for substantial circumferential forces to be generated. The attachment therefore must be able to take up such forces. It would accordingly be necessary to configure the attachment therefore, and also the anchoring in the tower wall would have to be configured for such forces.

BRIEF SUMMARY

Provided is a way for guiding bracing cables in a wind turbine power, which can also equalize manufacturing tolerances.

In particular, provided is a device for guiding bracing cables in a tower of a wind turbine comprises at least one guide bracket and one bracket mount. The guide bracket is intended to be arranged in the tower, between a tower wall and at least one of the bracing cables, in order that this at least one bracing cable then bears against the guide bracket and is thus guided, by means of the guide bracket, on the tower wall. In exemplary terms, the bracing cable will in this case also press against the guide bracket in the outward direction towards the tower wall. Thus, the bracing cable is nonetheless guided without the guide bracket having to hold the bracing cable in a form-fitting manner in the circumferential direction.

Preferably, such a guide bracket can also be used to provide minor deflection or redirection of the relevant bracing cable in the vertical direction. This is particularly relevant in the case of concave towers, that is to say towers which have inward curvature as seen in the vertical direction. For example, here a tower wall can have, in the vertical direction relative to a vertical central axis of the tower, an exponential function or a hyperbolic function. If, then, the bracing cable is guided from the top of the tower or at least from the upper end of the concrete tower section down to the foot of the tower, in particular to the bracing foundation, it would have to be at least partially guided along or redirected at such an inward curvature. This is where use can be made of such a guide bracket, which thus redirects the bracing cable from top to bottom and somewhat outwards.

A bracket mount is provided on the tower wall for attaching the guide bracket. This allows the circumferential position of the guide bracket to be changed along the bracket mount in order to match the position of the at least one bracing cable which it is to guide. It is thus possible, in particular when erecting the tower, for the bracket mount, possibly already together with the guide bracket for guiding and in particular also redirecting at least one bracing cable, to be arranged on the inside of the tower wall. If, then, the bracing cables are arranged and at least partially also already tensioned, it is then apparent to what extent in particular manufacturing tolerances have led to the position of the bracing cable shifting in the circumferential direction in comparison to the assumed position. This now allows the guide bracket to be adapted, in that its circumferential position is adjusted.

Preferably, the guide bracket has in essence a flat bearing surface on which the respective at least one bracing cable rests for guiding, no boundaries being provided in the circumferential direction, that is to say relative to the tower. This allows the circumferential position of the at least one bracing cable to be adjusted to a greater degree by adjusting the position of the guide bracket, while smaller adjustments can be canceled out or tolerated by means of a suitably broad guide bracket, namely a suitably broad bearing surface of the guide bracket.

Preferably, the guide bracket can be displaced in the circumferential direction along the bracket mount. Thus, in order to change the circumferential position of the guide bracket, the latter can simply be pushed in that direction.

As a preferred embodiment, it is proposed to that end that the bracket mount has two guide rails or consists of two guide rails in order to mount the guide bracket in a displaceable manner. In particular, the bracket mount has to that end an upper and a lower guide rail in order to attach the guide bracket essentially in its upper and lower region. In that context, the guide rails can for example have arcuate longitudinal slots in which the guide bracket can be attached and guided in a displaceable manner. Once the desired position for the guide bracket has been established, it can also be secured in such arcuate longitudinal slots, or similar recesses, in order to then avoid undesired displacement in the circumferential direction.

Moreover, the bracket mount itself is in particular attached directly to the tower and can thus attach the guide bracket to the tower in a simple and variable manner.

Preferably, the upper and the lower guide rail have different radii, specifically different radii of curvature, in order to match the respective tower radius at different heights in the tower and thus to nonetheless permit displaceability of the guide bracket in the circumferential direction. It is thus possible, even when the guide bracket and/or the bracket mount are/is arranged in a conical section of the tower, to vary and in particular displace the guide bracket in the circumferential direction.

Preferably, the bracket mount is provided for attaching multiple guide brackets. It is in particular possible to arrange, as bracket mount, at least two long guide rails, that is to say in particular an upper and a lower guide rail, which at least partially extend in the circumferential direction on the inside of the tower wall. One or more guide brackets can then be arranged thereon, each guiding or receiving one or more bracing cables. In that context, the circumferential position of each guide bracket along this bracket mount can be changed, in particular displaced. This makes it possible, particularly simply, to provide a small number of bracket mounts and possibly even only one bracket mount while at the same time providing multiple guide brackets.

Preferably, the guide rails are secured to the tower wall from the inside and match the respective radius of the tower at the corresponding height. This permits simple attachment of the at least one guide bracket. The provision of special elements of the bracket mount in the concrete during casting of the respective concrete segment is not necessary. In addition, this also allows the intended position to be varied according to the height. Preferably, these guide rails, which are accordingly part of the bracket mount or form the latter, are provided as curved angle rails which match the corresponding radius. Accordingly, such an angular rail has a surface for attaching to the tower wall and a surface in which in particular longitudinal slots for attaching the at least one guide bracket in a displaceable manner are provided. Such guide rails to be attached to the tower wall from the inside make the device for guiding bracing cables particularly well-suited as a retrofit solution.

Also provided is a tower of a wind turbine. The tower has a concrete section or is a tower made entirely of concrete and is designed to be braced using bracing cables. These bracing cables are guided outside the tower wall, inside the tower, and to that end use is made of at least one device for guiding bracing cables, in accordance with at least one of the above-described embodiments.

Also provided is a wind turbine. This makes it simple to provide and erect, and accordingly brace, a wind turbine.

Also provided is a method for erecting a tower of a wind turbine and thus also for erecting a wind turbine. In particular, this involves first erecting the concrete tower or the concrete tower section and then providing the bracing cables and, simultaneously, prior to this or shortly thereafter, providing, on the tower wall from the inside, devices for guiding bracing cables in accordance with at least one of the above-described embodiments. The next step is to check how the bracing cables fall or position themselves during tensioning. Depending on this, the corresponding guide bracket is then displaced in the circumferential direction relative to the bracket mount, in particular guided by the bracket mount, in order that the respective bracing cable(s) can lie on the guide bracket. The respective bracing cable(s) can now be tautened, thus concluding at least this part of the erection of the tower.

BRIEF DESCRIPTION OF THE SEVERAL VIEWS OF THE DRAWINGS

The present invention is explained in more detail below by way of example on the basis of exemplary embodiments with reference to the accompanying figures.

DETAILED DESCRIPTION

Figure 1:
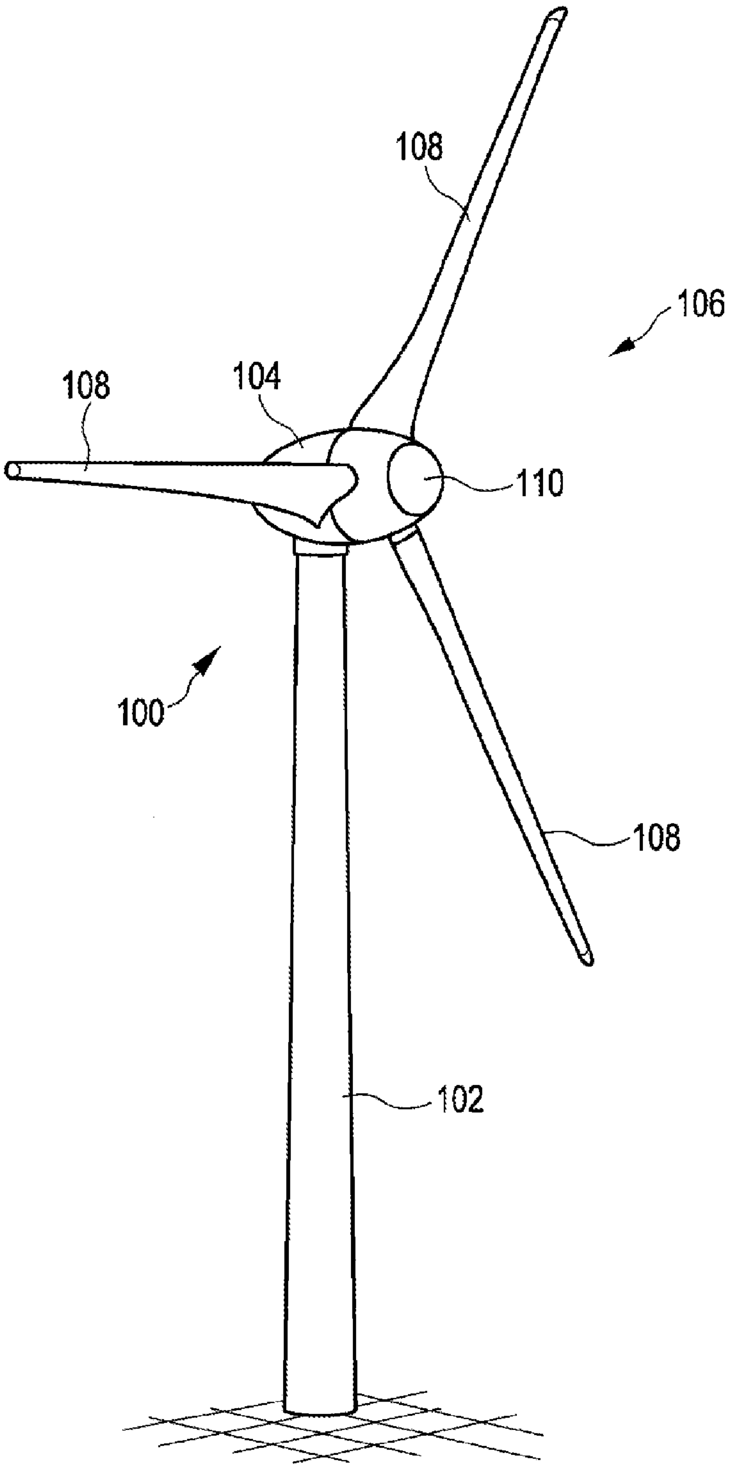
FIG. 1 shows a wind turbine in a perspective view.

FIG. 1 shows a wind turbine 100 with a tower 102 and a nacelle 104. Arranged on the nacelle 104 is a rotor 106 with three rotor blades 108 and a spinner 110. During operation, the rotor 106 is set in rotation by the wind and thereby drives a generator in the nacelle 104.

Figure 2:
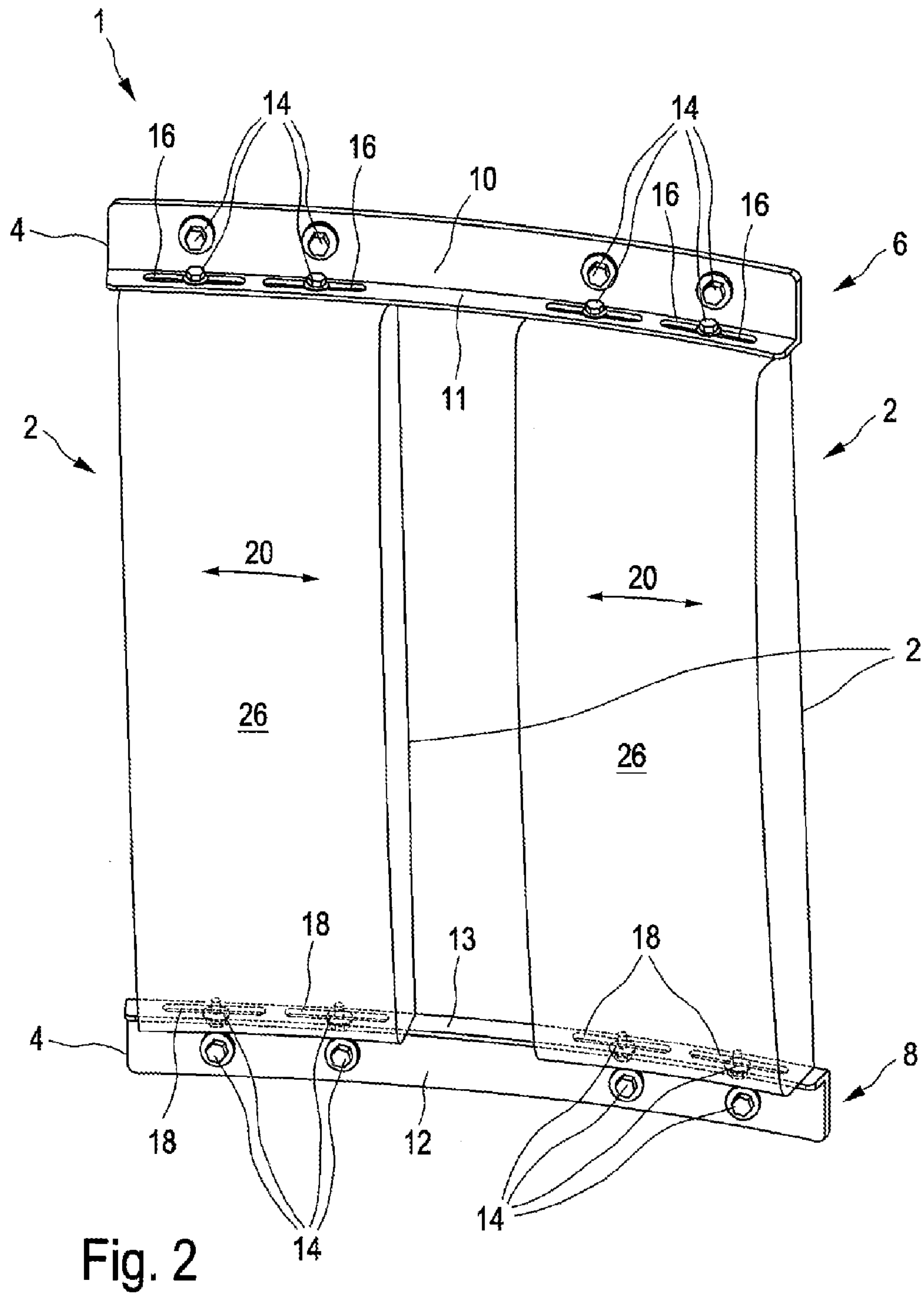
FIG. 2 shows a device for guiding bracing cables in a perspective illustration.

FIG. 2 shows, in a perspective view, a device for guiding bracing cables which, more simply, can also be termed guide device 1. This guide device 1 has two guide brackets 2 and one bracket mount 4, consisting of an upper guide rail 6 and a lower guide rail 8. The guide device 1 is attached to a tower inner wall by means of the bracket mount 4, namely the two guide rails 6 and 8. This situation is illustrated in FIG. 2, the tower wall not being shown. What is in particular apparent, though, is the curved shape of the upper guide rail 6 and of the lower guide rail 8, which corresponds to the curvature, namely the internal radius of the tower wall at that respective point.

Both guide rails 6 and 8 are of angular design and each have a wall section 10 or, respectively, 12 for attaching to the tower wall and a bracket section 11 or, respectively, 13 which is arranged approximately at right angles thereto and serves for attaching at least one guide bracket thereto. Both for attaching to the tower wall and for attaching to the at least one guide bracket, attachment means 14 in the form of screws are provided. For the sake of simplicity, these attachment means 14 are provided with the same reference sign, although they can be different between the upper and lower guide rail 6 or 8, and also those used for attaching the wall sections 10 or 12 can be different to those used for attaching the at least one guide bracket to the bracket section 11 or 13. Preferably, the attachment means proposed in each case here are screws, possibly of different sizes, as is also indicated in FIG. 2.

Now, for attaching the guide brackets 2, longitudinal slots 16 and, respectively, 18 are provided in the bracket sections 11 and 13. In this illustration, the longitudinal slots 18 of the lower guide rail 8 and thus of the lower bracket section 13 are covered by the guide brackets 2 and are therefore indicated only by dotted lines.

The two guide brackets 2 can now be arranged between the two guide rails 6 and 8 and thus between the two bracket sections 11 and 13, and can be attached in the longitudinal slots 16 and 18 by means of attachment means 14. As long as the attachment is still loose, the guide brackets 2 can still be displaced independently of one another in the circumferential direction 20 which is in each case indicated by a double arrow. Once the guide brackets 2 are each in their desired position, they can be fixed in place using the corresponding attachment means 14.

Figure 3:
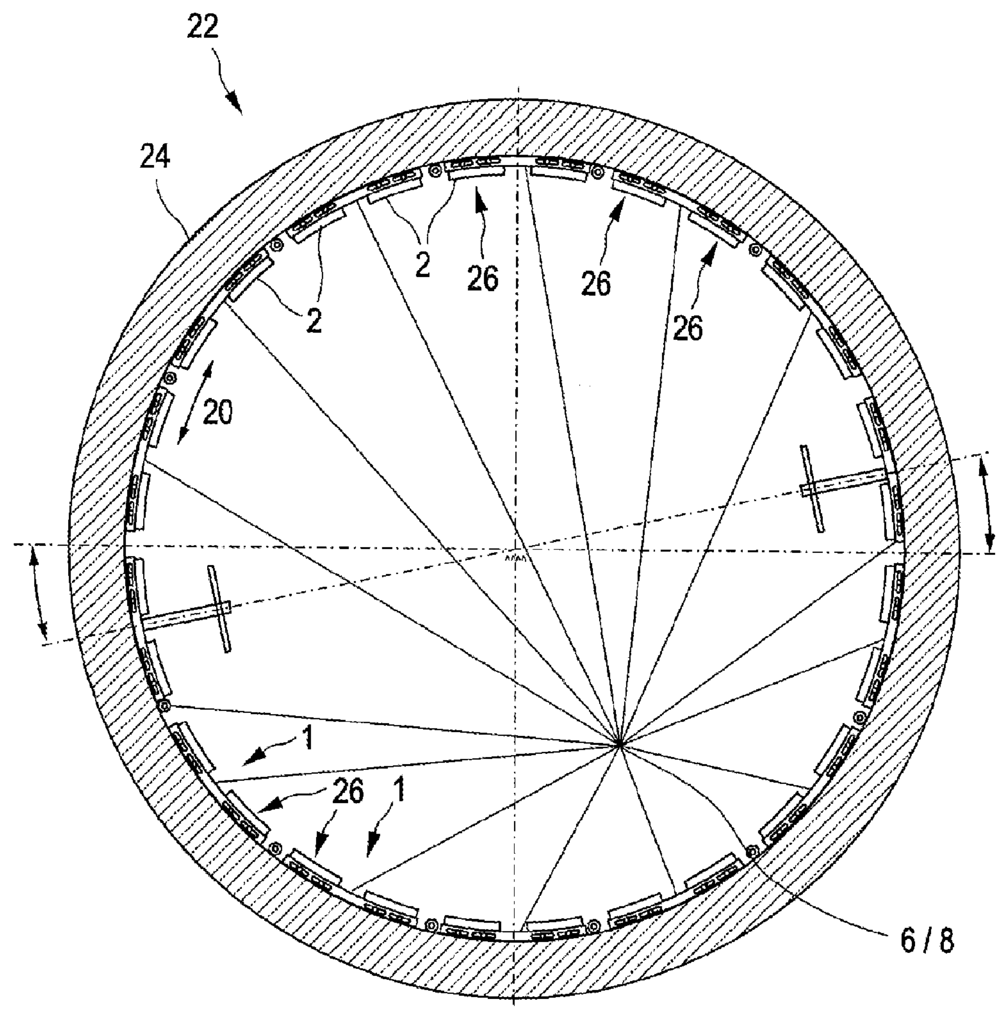
FIG. 3 shows a plan view of a tower of a wind turbine, in a section view.

The tower 22 of FIG. 3, which is shown there in a section view from above, has various guide brackets 2 distributed over its circumference, of which two belong to one guide device 1. In each case, two guide brackets 2 are connected to one another via an upper and a lower guide rail 6 and, respectively, 8. These reference signs 6 and 8 are listed in FIG. 3, although in each case the upper guide rail 6 hides the lower guide rail 8.

In any case, the upper and lower guide rails 6 and 8 are attached from the inside to the tower wall 24. Now, the bracing cables can be arranged and can each lie on receiving surfaces 26 of each guide bracket 2.

Figure 4:
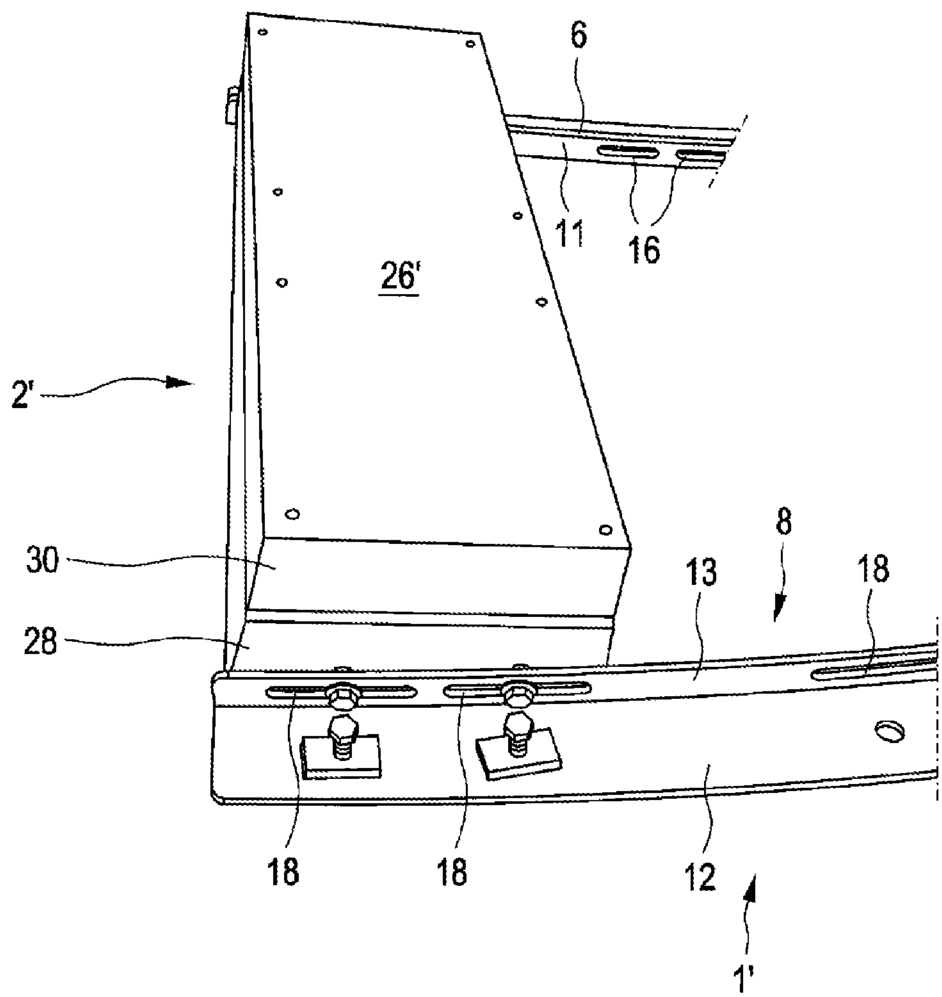
FIG. 4 shows a device for guiding bracing cables in accordance with another embodiment.

FIG. 4 shows a guide bracket 2' together with an upper and a lower guide rail 6 and, respectively, 8 prior to assembly to form a guide device 1'. The guide device 1' provided as shown in FIG. 4 also has two guide brackets 2', in accordance with the specification. In that context, the second guide bracket 2' is not shown in FIG. 4.

In particular, FIG. 4 shows the wall section 12, and the bracket section 13 with longitudinal slots 18, of the lower guide rail 8. FIG. 4 shows the bracket section 11, with two longitudinal slots 16, of the upper guide rail 6.

Here, the guide bracket 2' has a main body 28 which is to be attached to each of the bracket sections 11 and 13 and, in accordance with the specification, bears against a tower wall from the inside, that is to say against a tower inner wall. The main body 28 is also provided with an equalizing body 30 which in this case forms the receiving surface 26'. This equalizing body 30, which can also be formed of multiple individual bodies, provides the guide bracket 2' with greater thickness and can thus achieve or equalize a greater separation between the tower wall and the bracing cable.

This provides, in a simple manner, a guide device which is particularly easy to manufacture and can be adapted to tolerances and which can guide bracing cables inside the tower. In addition, it is equally well-suited for retrofitting.

The invention claimed is:

1. A device for guiding bracing cables in a tower of a wind turbine, the device comprising:

at least one guide bracket configured to be arranged in the tower between a tower wall and at least one of the bracing cables, such that the at least one bracing cable rests against the at least one guide bracket and is thereby guided along at least a portion of the tower wall, and a bracket mount for attaching the at least one guide bracket to the tower wall, wherein the at least one guide bracket is configured to move relative to the bracket mount in the circumferential direction of the tower in order to place the at least one guide bracket in a position that corresponds to the at least one bracing cable, wherein the bracket mount is configured to be attached to an inner tower wall, and wherein the at least one bracing cable rests against an exposed surface of the at least one guide bracket.

2. The device according to claim 1, wherein the at least one guide bracket has a flat mounting surface that remains open in the circumferential direction, wherein the at least one bracing cable rests against the flat mounting surface of the at least one guide bracket.

3. The device according to claim 1, wherein the at least one guide bracket is configured to be displaced along the bracket mount in the circumferential direction.

4. A device for guiding bracing cables in a tower of a wind turbine, the device comprising:

at least one guide bracket configured to be arranged in the tower between a tower wall and at least one of the bracing cables, such that the at least one bracing cable rests against the at least one guide bracket and is thereby guided along at least a portion of the tower wall, and a bracket mount for attaching the at least one guide bracket to the tower wall, wherein the at least one guide bracket is configured to move relative to the bracket mount in the circumferential direction of the tower in order to place the at least one guide bracket in a position that corresponds to the at least one bracing cable, wherein the bracket mount includes an upper guide rail and a lower guide rail, the at least one guide bracket being configured to be displaceably attached to the upper and lower guide rails so that the at least one guide bracket is able to move in the circumferential direction.

5. The device according to claim 4, wherein the upper and the lower guide rails are curved and have different radii from each other.

6. The device according to claim 1, wherein the bracket mount is provided for attaching a plurality of guide brackets to the tower wall, the device having a plurality of guide brackets.

7. The device according to claim 4, wherein the upper and lower guide rails are secured to an inner surface of the tower wall at respective heights and have curvatures that correspond to a respective radius of the tower at the corresponding height.

8. A tower of a wind turbine comprising:

a concrete section braced by bracing cables, wherein the bracing cables are guided inside the tower, wherein at least one device according to claim 1 is used to guide at least one of the bracing cables.

9. A wind turbine having a tower according to claim 8.

10. A method comprising:

erecting a wind turbine, wherein erecting includes:

erecting a tower having a concrete section;

mounting a guide bracket to the concrete section; and bracing the concrete section by bracing cables, wherein at least one of the bracing cables is guided along an inside surface of the tower, wherein the guide bracket is between the inside surface of the tower and the at least one bracing cable so that the at least one bracing cable rests against an exposed surface of the guide bracket.

11. The method according to claim 10, wherein the guide bracket includes a bracket mount for mounting to the concrete section.

12. The method according to claim 10, wherein the guide bracket includes a flat mounting surface, wherein the bracing cable rests against the flat mounting surface.

13. The device according to claim 5, wherein the radii of the upper and the lower guide rails correspond to a respective tower radius at different heights in the tower.

* * * * *